United States Patent Office 3,037,966
Patented June 5, 1962

3,037,966
METHOD FOR PRODUCING POLYIMIDES FROM DIAMINES AND DI-ACID DI-ESTER DERIVATIVES OF DIANHYDRIDES
Sui-Wu Chow, Bridgewater Township, and John M. Whelan, Jr., New Providence, N.J., assignors to Union Carbide Corporation, a corporation of New York
No Drawing. Filed Apr. 1, 1960, Ser. No. 19,153
11 Claims. (Cl. 260—78)

This invention relates to method for producing polyimides from di-acid di-ester derivatives of bicyclic-tetracarboxylic acid dianhydrides and diprimary diamines. More particularly, the invention relates to method for producing polyimides by the reaction of di-acid di-ester derivatives of dianhydrides represented by the general formula:

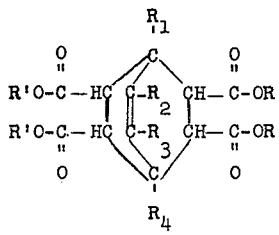

wherein one R and one R' are hydrogen atoms and the other R and R' are alkyl radicals having up to 12 carbon atoms, $R_1$, $R_2$, $R_3$ and $R_4$ are each members selected from the group consisting of hydrogen, alkyl, aryl and halogen groups; with a diprimary diamine which has the formula

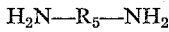

$$H_2N-R_5-NH_2$$

wherein $R_5$ is a divalent hydrocarbon free of aliphatic unsaturation.

The bicyclic-tetracarboxylic acid dianhydrides from which the di-acid di-esters useful in the present invention are derived are alicyclic in nature. Therefore, these bicyclic compounds are to be sharply distinguished from dianhydrides and dianhydride derivatives in which the carboxyl groups are directly linked to an aromatic ring such as the dianhydride of 2,2-bis(3,4-dicarboxyphenyl) propane. Aryl dianhydrides are essentially different, both in structure and in reactivity with diamines from bicyclic dianhydrides and their di-acid di-ester derivatives with which latter the method of this invention is concerned.

Polyimidies having bicyclic rings are thermoplastic materials with very high softening temperatures, good thermal stability, highly desirable electrical properties, excellent moisture permeability characteristics and high stress rupture resistance. These polymers have been prepared heretofore by the Diels-Alder reaction of bifunctional dienes with bis-maleimides. Methods previously known for the production of these polyimides have required the use of a bis-maleimide as an intermediate. The necessary bis-maleimides, however, are not commercially available, and exploitation of the polyimides with their useful properties has been retarded. The required bis-maleimides can be prepared by the reaction of maleic anhydride with a diamine to give a bis-maleamic acid which is subquently cyclized to the bis-maleimide but this method provides only low yields of a generally impure product and, hence, is not satisfactory as a step in commercial production of polyimides.

It is an object, therefore, of the present invention to provide a method for producing polyimides wherein the use of bis-maleimides as intermediates and the steps of bis-maleimide synthesis are eliminated.

It is another object to provide a commercially attractive, inexpensive and convenient method for producing polyimides.

We have now discovered that these and other objects are achieved in accordance with the present invention by reacting a di-acid di-ester derivative of a bicyclic-tetracarboxylic acid dianhydride with a diprimary diamine to form a polyamic acid-ester, and heating the polyamic acid ester to an elevated temperature sufficient to cause cyclization to the polyimide. Progress of the reaction can be observed by the evolution of alcohol split off from the polyamic acid-ester as a result of the cyclization. The reaction mixture is maintained at an elevated temperature until imidification is substantially complete as indicated by the cessation of evolution of alcohol.

The di-acid di-ester is prepared by reaction of an alkanol having up to 12 carbon atoms with a tetracarboxylic-bicyclic acid dianhydride. Progress of the esterification can be observed by the formation of a homogeneous system from the initially formed two-phase system.

The reaction, in general, proceeds according to the following simplified scheme wherein R, $R_1$, $R_2$, $R_3$, $R_4$ and $R_5$ have the significance given above. R and R' are the same alkyl group in one occurrence and hydrogen atoms in the other occurrence.

I

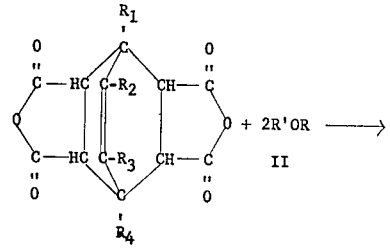

III

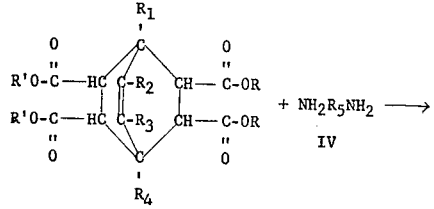

V

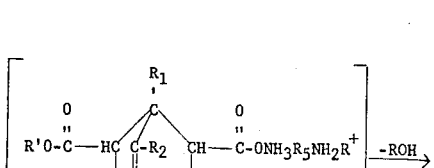

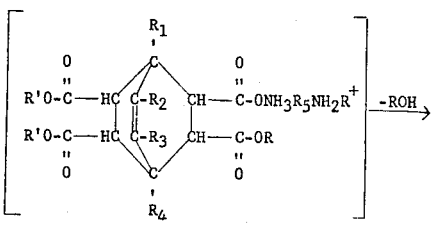

VI

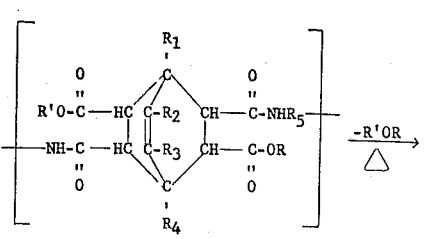

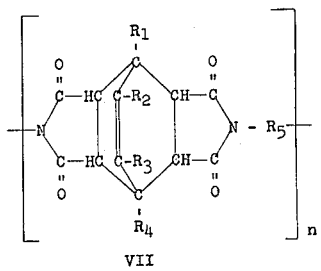

VII wherein $n$ is an integer such that the polymer has a molecular weight sufficient to give a reduced viscosity of at least 0.1 measured at 25° C. as a 0.2 gram sample in 100 ml. of dimethylformamide. Reduced viscosity methods are preferred for convenience sake to indicate the degree of polymerization of the product and are, therefore, used throughout the present specification and claims to characterize the polymers of this invention.

The above reaction scheme is shown with equimolar amounts of the reactants, but it is not necessary in practicing the present invention to employ equimolar amounts. Their use, however, produces the highest molecular weight polymers, i.e., those having the greatest reduced viscosity. Polymers made using a greater mole percent of one or the other of the reactants have a commensurately lower reduced viscosity. The use of extreme proportions of reactants produces only lower reduced viscosity resins and, hence, is generally not to be desired.

The more desirable products of the method of this invention from the standpoint of ease of fabrication and useful properties are those having reduced viscosities of at least about 0.3, and these are preferred. Higher reduced viscosities, on the order of 0.4 to 0.7 and above, are characteristic of polyamides of superior properties which are particularly preferred. In order to achieve these preferred reduced viscosities, the bicyclic tetracarboxylic acid dianhydride and the diprimary diamine are employed in at least substantially equimolar amounts, i.e., from about 1.05 to 0.95 mole of either monomer per mole of the other monomer.

The series of reactions leading to a polyimide via a di-ester di-acid depicted above are carried out in a preferred embodiment by placing the desired bicyclic-tetracarboxylic acid dianhydride (I) together with an excess of an alkanol (II) in a suitable vessel. At first these compounds generally form a two-phase, heterogeneous system. As esterification progresses, with the aid of heat if desired, the system becomes homogeneous. Complete homogeneity indicate completion of the esterification. Or the amount of di-acid di-ester present can be determined by titration with alkali.

The di-ester di-acid obtained is then mixed with an equimolar amount of a diprimary diamine (IV) suitably added as an alcohol solution. The mixture is then heated to a temperature sufficient to cause reaction of the diprimary diamine and the di-ester di-acid, usually at least about 25° C. and more, thereby forming a diammonium carboxylate (V) which is reacted to form a polyamic acid-ester (VI) by splitting off water. Heating can be continued at atmospheric, superatmospheric or sub-atmospheric pressures to cyclize the polyamic acid ester to the polyimide by splitting off the alkanol. Or the polyamic acid ester (VI) can be isolated by precipitation from the alcohol solution with a suitable solvent, e.g., ether and purified, if desired, by redissolving in alcohol and reprecipitating with ether and subsequently cyclized.

To increase efficiency of the reaction and obtain better yields of polyimide, the formation of the intermediate polyamic acid-ester (VI) is allowed to take place at a lower temperature than is required for imidification. This substantially prevents or minimizes the loss of diamine. If desired, the above polyamic acid-ester formation and polyimidification reactions can be carried out in the presence of solvents which lower the viscosity of the reaction mixture, and thereby provide more efficient mixing and more uniform heating of the reaction mass. Suitable solvents for the preparation of the polyamic acid-ester are halogenated hydrocarbons boiling above 150° C. at operating pressures, i.e., sym-tetrachloroethane, 1,1,3-trichloroethane, o-dichlorobenzene and the like.

Preferably temperatures for imidification are above about 180° C. and up to about 325° C.

Suitable solvents for the cyclization or polyimidification step are inert organic liquids which have boiling points at operating pressures in excess of about 80°, e.g., α-chloronaphthalene, m-cresol and the like.

Illustrative of the prepartion of the di-ester di-acid are the following specific procedures:

The dianhydride, 1,4-dimethyl-7,8-diphenyl-$\Delta^7$-bicyclo(2.2.2.)octene - 2,3,5,6 - tetracarboxylic dianhydride is mixed with an excess amount of methanol at a temperature of about 64° C. After about twenty hours a homogeneous solution, indicative of esterification, is obtained.

The dianhydride, 1,4,7,8-tetrachloro-$\Delta^7$-bicyclo(2,2,2,)octene-2,3,5,6-tetracarboxylic dianhydride is mixed with an excess amount of methanol at 25° C. After thirty minutes esterification is completed.

The two specific procedures given above for preparing the di-acid di-ester for use in our method are only illustrative of suitable methods and typical esterifying alcohols for preparing the di-acid di-esters and are not to be construed as the sole means of accomplishing the preparation. For the purposes of this invention, the di-acid di-esters obtained above are equivalent and perform equally well in producing polyamic acid-esters for cyclization to corresponding polyimides. Only polyamic acid esters produced by the reaction of di-acid di-esters of tetracarboxylic acid dianhydrides with diprimary diamines are useful in the method of this invention.

The polyimides are obtained from the polyamic acid ester intermediates by cyclizing or imidifying the acid. The final step to the polyimide can be carried out apart from the preparation of the intermediate by transferring the polyamic acid ester to a shearing mill wherein efficient mixing under reduced pressures, e.g., 5 mm. Hg and inert atmosphere, e.g., nitrogen, is provided, at elevated temperatures, e.g., 275° C. Shearing under these conditions for about two hours generally is sufficient to polyimidify the polyamic acid ester.

Alternatively, the polyimidification can be carried out as an integral part of the polyamic acid ester preparation reaction. This is accomplished by continuing heating with a refluxing solution of the di-acid di-ester of the bicyclic-tetracarboxylic acid dianhydride and the diamine in a solvent, boiling at above about 180° C., such as o-dichlorobenzene with efficient stirring past the point where a polyamic acid ester is obtained, thereby cyclizing the polyamic acid ester; and removing the alcohol of reaction by azeotropic distillation with the solvent.

Among the dicyclic-tetracarboxylic acid dianhydrides useful in the method of this invention are those prepared from maleic anhydride and 2-pyrones in a manner such as described by Diels and Alder (Ann. 490, 257 (1931)). Bicyclic-tetracarboxylic acid dianhydrides prepared from other compounds and in any other manner are also useful. As described above, bicyclic-tetracarboxylic acid dianhydrides having thereon as substituents in one or more positions an alkyl group, an aryl group, an aralkyl group or a halogen group, can be used to form polyimides by the method of this invention.

The substituent groups do not enter into the reaction and hence their nature, position and size are not of critical importance. Among the preferred substituents are: as alkyl and cycloalkyl substituents, groups having one to 20 or more carbon atoms, e.g., methyl, cyclohexyl and eicosyl groups, preferably groups having at least five carbon atoms; as aryl and alkaryl substituents mono- and polynuclear aryl groups, e.g., phenyl, cresyl, xylyl, and naphthyl groups having from six to 20 or more carbon atoms; as halogen substituents chloro, chloromethyl and chlorophenyl groups. Specific dianhydrides deserving special mention are: 1,8 - dimethyl-$\Delta^7$-bicyclo(2.2.2.)octene-2,3,5,6-tetracarboxylic acid dianhydride; 7,8-diphenyl - $\Delta^7$ - bicyclo(2.2.2.)octene-2,3,5,6-tetracarboxylic acid dianhydride; 1,4-dimethyl-7,8-diphenyl-$\Delta^7$-bicyclo(2.2.2.)octene - 2,3,5,6-tetracarboxylic acid dianhydride; and 1,4,7,8 - tetrachloro-$\Delta^7$-bicyclo(2.2.2.)octene-2,3,5,6-tetracarboxylic acid dianhydride.

The diamines employed in the formation of the polymeric products by the method of this invention are di-primary diamines free of aliphatic unsaturation, i.e., the amine groups of which are separated by a hydrocarbon group free of aliphatic unsaturation, designated as $R_5$ in Formula IV above. The group $R_5$ can be any divalent hydrocarbon group such as alkylene, arylene, aralkylenes, alkarylenes and substituted derivatives thereof, preferably containing fewer than about 20 carbon atoms. For example, $R_5$ can be methylene, ethylene, propylene, butylene, hexamethylene, decamethylene, eicosylene, phenylene, biphenylene, tolylene, ditolylene, xylylene, a methylenediphenyl group or an alkyl substituted methylene diphenyl group such as tetramethyl methylene diphenyl, propylene diphenyl, diethyl methylene diphenyl or naphthalene groups and alkyl derivatives thereof, and the like.

In order to illustrate the practice of my invention, the following examples are presented. All parts and percentages are by weight.

The procedure of the examples was, in general, as follows: the bicyclic-tetracarboxylic acid dianhydride is mixed with excess alcohol and reacted therewith either at room temperature or with heat. The resulting di-acid di-ester of the bicyclic-tetracarboxylic acid dianhydride is then allowed to react with a diamine added as an alcohol solution. In the course of this reaction the excess alcohol is evaporated off. The residue was either immediately heated to a polyimidification temperature in the presence of a solvent or as a melt (Group I), or was isolated and thereafter imidified (Group II). Final heating in stages is preferred.

GROUP I

Examples 1–2

The bicyclic tetracarboxylic acid dianhydride used was 7,8 - diphenyl - $\Delta^7$ - bicyclo(2.2.2.)octene - 2,3,5,6-tetracarboxylic dianhydride (in Formula I above $R_1=R_4=H$; $R_2=R_3=C_6H_5$). This dianhydride was prepared from 2,4-dimethyl-3,4-diphenylcyclopentadienone in about 90% yield by the procedure described by C. F. H. Allen and J. Van Allen, J. Am. Chem. Soc., 64, 1260 (1942).

The di-acid-di-ester derivative was prepared by stirring overnight 6.426 parts of the dianhydride with 50 parts of methanol.

The polyamic acid ester was prepared by mixing the above product with 2.345 parts of nonamethylene diamine. The excess alcohol was evaporated off on a steam bath. The residue was heated to 160° C. for 2 hours, at 200° C. for one more hour, and finally heated in boiling α-chloronaphthalene for one additional hour.

A similar reaction was run using hydrochloric acid as a catalyst and appears as Example 2 in Table I below.

TABLE I.—POLYIMIDE FROM 7,8-DIPHENYL-$\Delta^7$-BICYCLO(2.2.2.)OCTENE-2,3,5,6-TETRACARBOXYLIC DIANHYDRIDE

| Ex. | Esterification | | | | Diamine | Imidification | | R. V.[1] |
|---|---|---|---|---|---|---|---|---|
| | Alcohol | Temp., °C. | Time, hrs. | Cat. | | Temp. | Hours | |
| 1 | CH₃OH | ca. 25 | 16 | none | nonamethylene | 150–160° | 2 | |
| | | | | | | 200° | 1 | |
| | | | | | | [2] 260° | 1 | 0.22 |
| 2 | CH₃OH | Reflux | 1 | hydrochloric acid | do | 150–160° | 2 | |
| | | | | | | 220° | 1 | |
| | | | | | | [2] 260° | 1 | 0.17 |

[1] Reduced viscosities determined on 0.2 gram samples at 25° C. in 100 ml. dimethylformamide.
[2] Heat at reflux in α-chloronaphthalene.

Examples 3–6

The dianhydride used was 1,4-dimethyl-7,8-diphenyl-$\Delta^7$-bicyclo(2.2.2)octene - 2,3,5,6 - tetracarboxylic dianhydride (in Formula I $R_1=R_4=CH_3$; $R_2=R_3=C_6H_5$). The data of each example are given in Table II below.

TABLE II.—POLYIMIDE FROM 1,4 - DIMETHYL - 7,8 - DIPHENYL - $\Delta^7$ - BICYCLO(2.2.2.)OCTENE-2,3,5,6-TETRACARBOXYLIC DIANHYDRIDE

| Ex. | Esterification | | | Diamine | Imidification | | R.V.[1] |
|---|---|---|---|---|---|---|---|
| | Alcohol | Temp., °C. | Time (hr.) | | Temp. | Hours | |
| 3 | CH₃OH | reflux | 22 | nonamethylene | 150–160° | 2 | |
| | | | | | 200° | 1½ | |
| | | | | | [2] 260° | ½ | 0.1 |
| 4 | CH₃OH | do | 2 | hexamethylene | 150° | 2.5 | |
| | | | | | 220–240° | 2 | 0.08 |
| 5 | CH₃OH | do | 1 | do | 200° | 1 | |
| | | | | | [2] 260° | 5 | 0.22 |
| 6 | C₂H₅OH | Ca. 25 | 1 | do | 220° | 5 | |
| | | | | | 250–270° | 2 | 0.26 |

[1] Reduced viscosities determined on 0.2 gram samples at 25° C. in 100 ml. dimethylformamide.
[2] Heat at reflux in α-chloronaphthalene.

Examples 7–8

The dianhydride used was 1,4,7,8-tetrachloro-Δ⁷-bicyclo(2.2.2)octene - 2,3,5,6 - tetracarboxylic dianhydride (in Formula I $R_1=R_2=R_3=R_4=Cl$). The data of the examples appear in Table III below.

TABLE III.—POLYIMIDE FROM 1,4,7,8-TETRACHLORO-Δ⁷-BICYCLO(2.2.2.)OCTENE-2,3,5,6-TETRACARBOXYLIC DIANHYDRIDE

| Ex. | Esterification | | | Diamine | Imidification | | |
|---|---|---|---|---|---|---|---|
| | Alcohol | Temp., °C. | Time (min.) | | Temp. | Hours | R.V.[1] |
| 7 | C₂H₅OH | Ca. 25 | 15 | nonamethylene | 150–160°<br>220°<br>250° | 2<br>1<br>½ | <br><br>0.12 |
| 8 | CH₃OH | reflux | 20 | do | 150–160°<br>300° | 1½<br>1 | <br>gel |

[1] Reduced viscosities determined on 0.2 gram samples at 25° C. in 100 ml. dimethylformamide.

GROUP II

Examples 9–11

The dianhydride used was 1,4,7,8-tetrachloro-Δ⁷-bicyclo(2.2.2)-2,3,5,6-tetracarboxylic dianhydride. To esterify the dianhydride 19.30 parts thereof was dissolved in about 50 parts of ethanol by gentle stirring and heating on a steam bath. The solution was filtered and 4.810 parts of hexamethylene diamine added thereto. After stirring at room temperature for about an hour a precipitate of hexamethylenediammonium di-ethyl-1,4,7,8-tetrachloro-Δ⁷-bicyclo-(2.2.2)-2,3,5,6-tetracarboxylate was formed (in Formula V $R_1=R_2=R_3=R_4=Cl$;

$$R_5=-(CH_2)_6-)$$

The precipitate was washed with ether.

Imidification of the tetracarboxylate was effected by charging the compound to a reaction vessel and purging with nitrogen. The vessel was sealed and heated at 180° C. for 2.5 hours and then at 220° C. and 1 mm. Hg pressure for another 2 hours. Similar reactions were run with varying procedures as indicated in Table IV below.

TABLE IV.—IMIDIFICATION OF HEXAMETYLENEDIAMMONIUM DIETHYL-1, 4, 7, 8-TETRACHLORO-Δ⁷-BICYCLO (2.2.2.)OCTENE-2, 3, 5, 6-TETRACARBOXYLATE

| Ex. | Solvent | Temp., °C | Pressure | Hours | R.V.[1] |
|---|---|---|---|---|---|
| 9 | none | 180–200<br>220 | Sealed Tube<br>1 mm. Hg | 2½<br>2 | <br>0.21 |
| 10 | m-cresol | 190–220 | atmospheric | 24 | 0.11 |
| 11 | none | 200<br>250 | Sealed Tube<br>0.5 mm. Hg | 18<br>5 | <br>0.18 |

[1] Reduced viscosities determined on 0.2 gram samples at 25° C. in 100 ml. dimethylformamide.

Examples 12–15

The tetracarboxylate used was hexamethylenediammonium dialkyl 1,4-dimethyl-7,8-diphenyl-Δ⁷-bicyclo(2.2.2)octene-2,3,5,6-tetracarboxylate (in formula V $R_1=R_4=CH_3$; $R_3=R_4=C_6H_5$; $R_5=(CH_2)_6$)

Data of the examples appear in Table V below.

TABLE V.—IMIDIFICATION OF HEXAMETHYLENEDIAMMONIUM DIALKYL 1,4-DIMETHYL-7, 8-DIPHENYL- Δ⁷-BICYCLO (2.2.2.)OCTENE-2,3,5,6-TETRACARBOXYLATE

| Ex. | Solvent | Temp., °C | Pressure | Hours | R.V.[1] |
|---|---|---|---|---|---|
| 12 | α-chloronaphthalene | reflux (260) | atmospheric | 5 | 0.15 |
| 13 | none | 180–190<br>180–190 | do<br>0.2 mm. Hg | 2<br>2 | <br>0.11 |
| 14 | do | 180–200 | atmospheric | 4 | 0.11 |
| 15 | m-cresol | 190–230 | do | 24 | 0.14 |

[1] Reduced viscosities determined on 0.2 gram samples at 25° C. in 100 100 ml. dimethylformamide Recovery of the polymer produced in the reaction is readily accomplished by precipitation thereof in a suitable coagulant such as excess methanol followed by washing, filtering and drying. Yields of from 95–100% of polymer are secured. Coagulation methods for recovering the product or alternatively stripping off the solvent under reduced pressures are preferred. Other methods for product recovery can be used.

The products of this invention are white to tan, hard, tough thermoplastic polymers having high softening points, generally at least 150° C., and more commonly closer to 200° C. and above. The products obtained from the aromatic diamines generally have higher softening temperatures than those from the aliphatic diamines, and range generally from 300° C. to 500° C. The products obtained in this invention are soluble in most halogenated hydrocarbon solvents, such as 3:2 phenol:tetrachloroethane, tetrachloroethane and in dimethylformamide. The lower softening polymers can be compression molded at temperatures of about 250° C., or cast into sheets or films from solution. The higher softening polymers are suitably cast from solution. The polymers are noncrystalline.

The interesting properties of these polymers suggest many specific applications. While the polymers produced are not too well suited to compression molding at low temperatures, films can be prepared from the polymer by dissolving the polymer in a solvent and casting the solution onto a glass plate or other hard nonporous, flat surface. Films of these polymers have exceptionally high tensile strengths for noncrystalline polymers, and have excellent electrical properties at high temperatures as well as good resistance to dilute alkali and acid solutions. Degradation even at temperatures of 200° C. and higher is very slow, making these polymers ideal for high temperature electrical work such as in electrical motors, insulating tapes and electronic tubes, also as varnishes for insulating materials in high temperature environments.

What is claimed is:

1. Method for producing polyimides comprising reacting together a di-acid di-ester derivative of a bicyclic-tetracarboxylic acid dianhydride having the formula

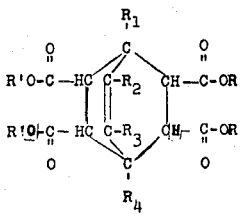

wherein one R and R' are hydrogen atoms and the other R and R' are alkyl radicals containing up to 12 carbon atoms and $R_1$, $R_2$, $R_3$ and $R_4$ are each members selected from the group consisting of hydrogen, alkyl, aryl, aralkyl and halogen groups; and a diprimary diamine having the formula $$H_2N-R_5NH_2$$

wherein $R_5$ is a divalent hydrocarbon group free of aliphatic unsaturation, to form a polyamic acid ester, heating said polyamic acid ester to a temperature above about 80° C. sufficient to cause cyclization to a polyimide characterized by the repeating unit:

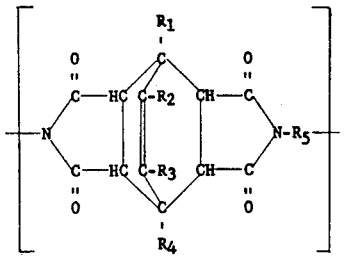

and having a reduced viscosity of at least about 0.1 measured at 25° C. as a 0.2 gram sample in 100 milliliters of dimethylformamide.

2. Method according to claim 1 wherein said di-acid di-ester and diamine are reacted together in the presence of an inert liquid organic solvent.

3. Method according to claim 2 wherein the reactants are reacted together at a temperature above about 150° C.

4. Method according to claim 2 wherein the polyamic acid ester is cyclized in the presence of an inert liquid organic solvent.

5. Method according to claim 4 wherein the polyamic acid ester is cyclized at a temperature above about 180° C.

6. Method for producing polyimides comprising reacting together in the presence of an inert liquid organic solvent which boils at a temperature above about 150° C. at operating pressure a di-acid di-ester derivative of a bicyclic-tetracarboxylic acid dianhydride having the formula

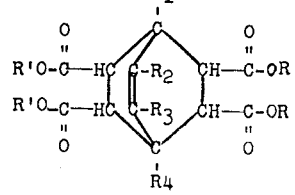

wherein one R and R' are hydrogen atoms and wherein the other R and R' are alkyl radicals containing up to 12 carbon atoms and $R_1$, $R_2$, $R_3$ and $R_4$ are each members selected from the group consisting of hydrogen, alkyl, aryl, aralkyl and halogen groups; and a diprimary diamine having the formula $$H_2N-R_5-NH_2$$

wherein $R_5$ is a divalent hydrocarbon group free of aliphatic unsaturation to form a polyamic acid ester, heating said polyamic acid ester in the presence of an inert liquid organic solvent which boils above about 180° C. at operating pressure until evolution of alkanol substantially ceases.

7. Method according to claim 6 wherein $R_5$ of said diamine contains up to twenty carbon atoms.

8. Method according to claim 6 wherein $R_5$ of said diamine is $-CH_2CH_2CH_2CH_2CH_2CH_2-$.

9. Method according to claim 6 wherein said dianhydride is 1,4-dimethyl-7,8-diphenyl-$\Delta^7$-bicyclo(2.2.2.)-octene-2,3,5,6-tetracarboxylic dianhydride.

10. Method according to claim 6 wherein said dianhydride is 1,4,7,8-tetrachloro-$\Delta^7$-bicyclo(2.2.2.)octene-2,3,5,6-tetracarboxylic dianhydride.

11. Method according to claim 6 wherein said dianhydride is 7,8-diphenyl-$\Delta^7$-bicyclo(2.2.2.)octene-2,3,5,6-tetracarboxylic dianhydride.

References Cited in the file of this patent

UNITED STATES PATENTS

| | | |
|---|---|---|
| 2,706,720 | Caldwell | Apr. 19, 1955 |
| 2,859,220 | Sauer | Nov. 4, 1958 |
| 2,890,206 | Kraiman | June 9, 1959 |
| 2,890,207 | Kraiman | June 9, 1959 |